G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.

Inventor
George W. R. Harriman
By
Attorneys.

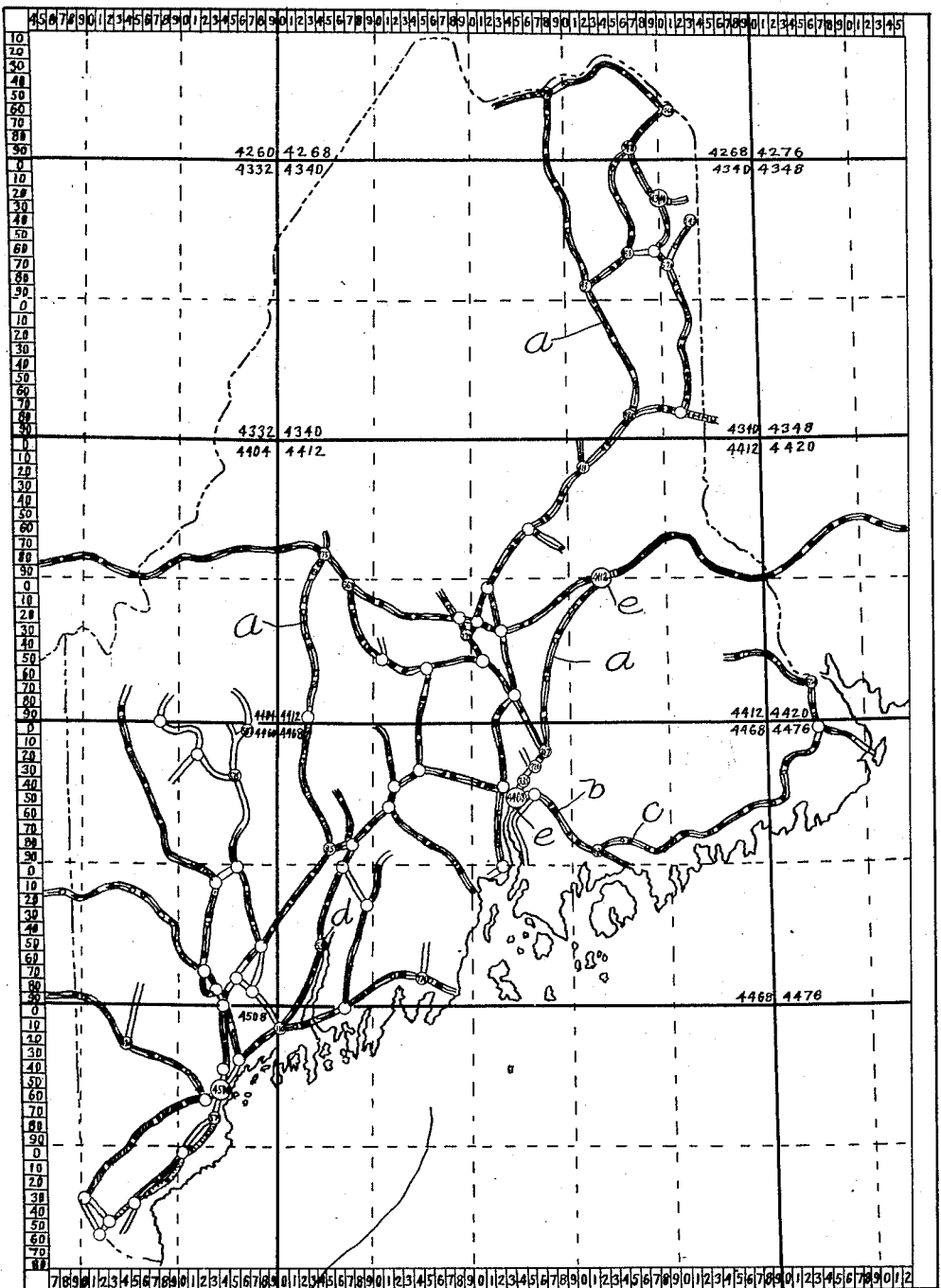

G. W. R. HARRIMAN.
MEANS FOR PRESENTING GEOGRAPHICAL AND STATISTICAL INFORMATION.
APPLICATION FILED JUNE 23, 1916.
1,362,939.       Patented Dec. 21, 1920.
17 SHEETS—SHEET 4.
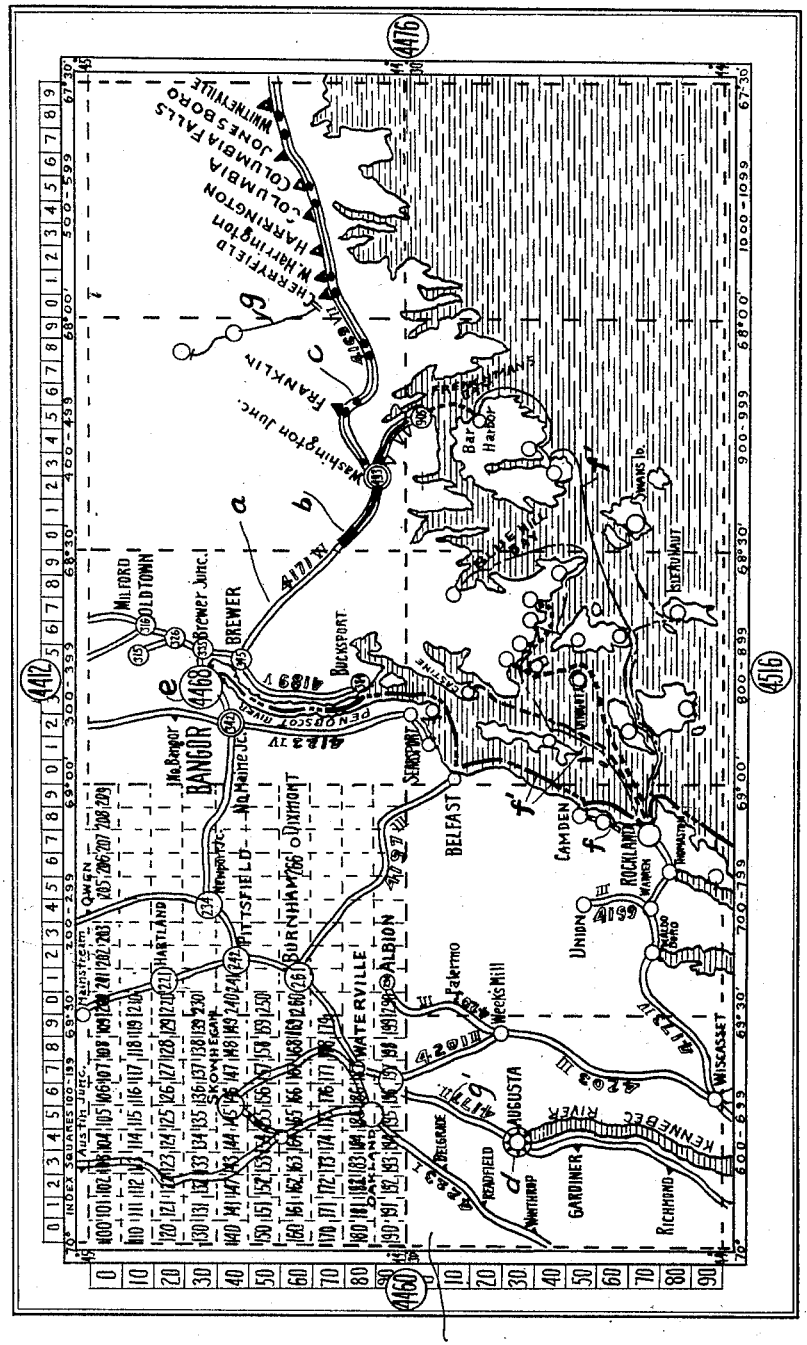
Inventor
George W. R. Harriman
By Wight, Brown, Quinby & Way
Attorneys.

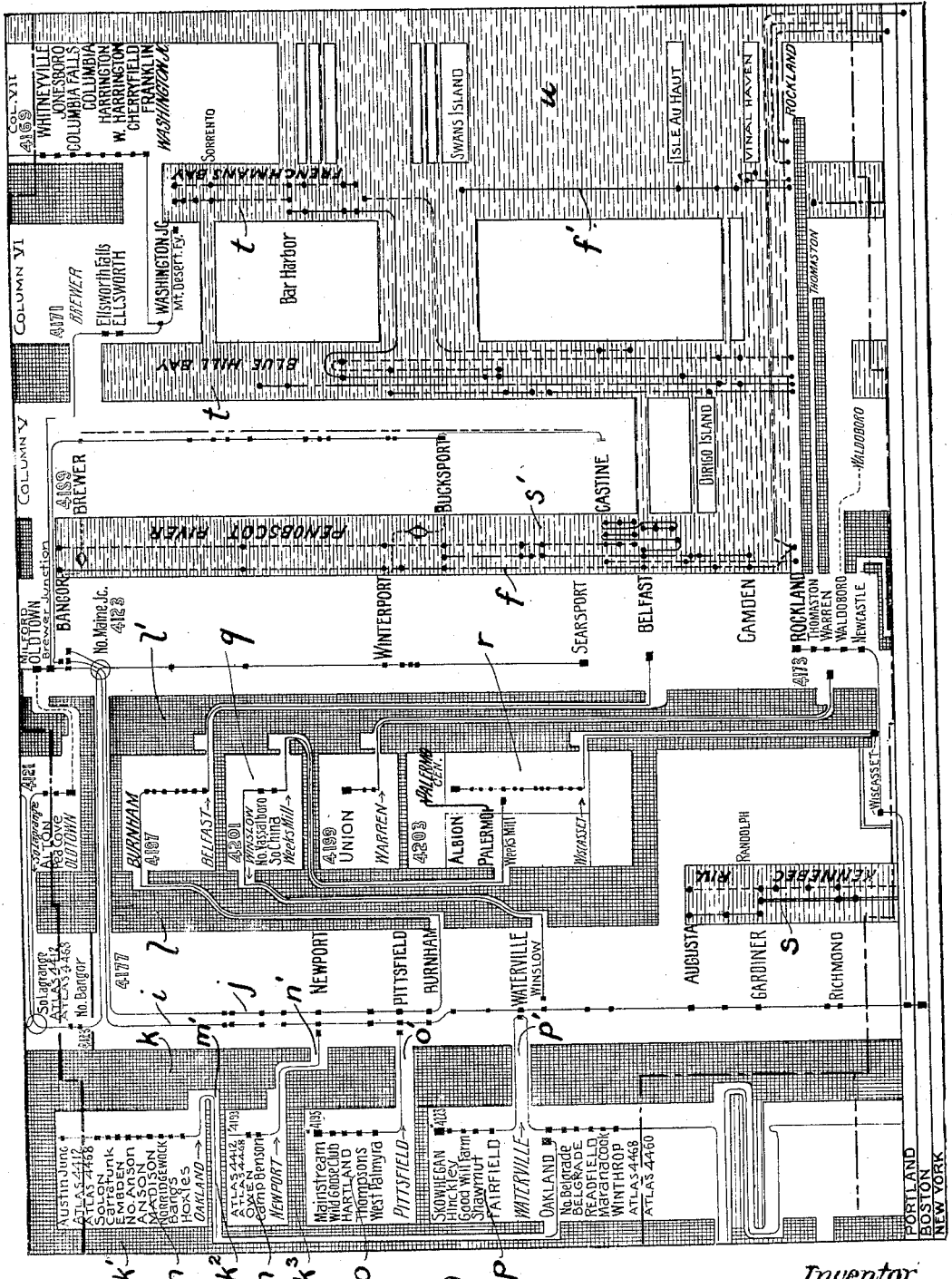

G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.
17 SHEETS—SHEET 6.

Figure 14:
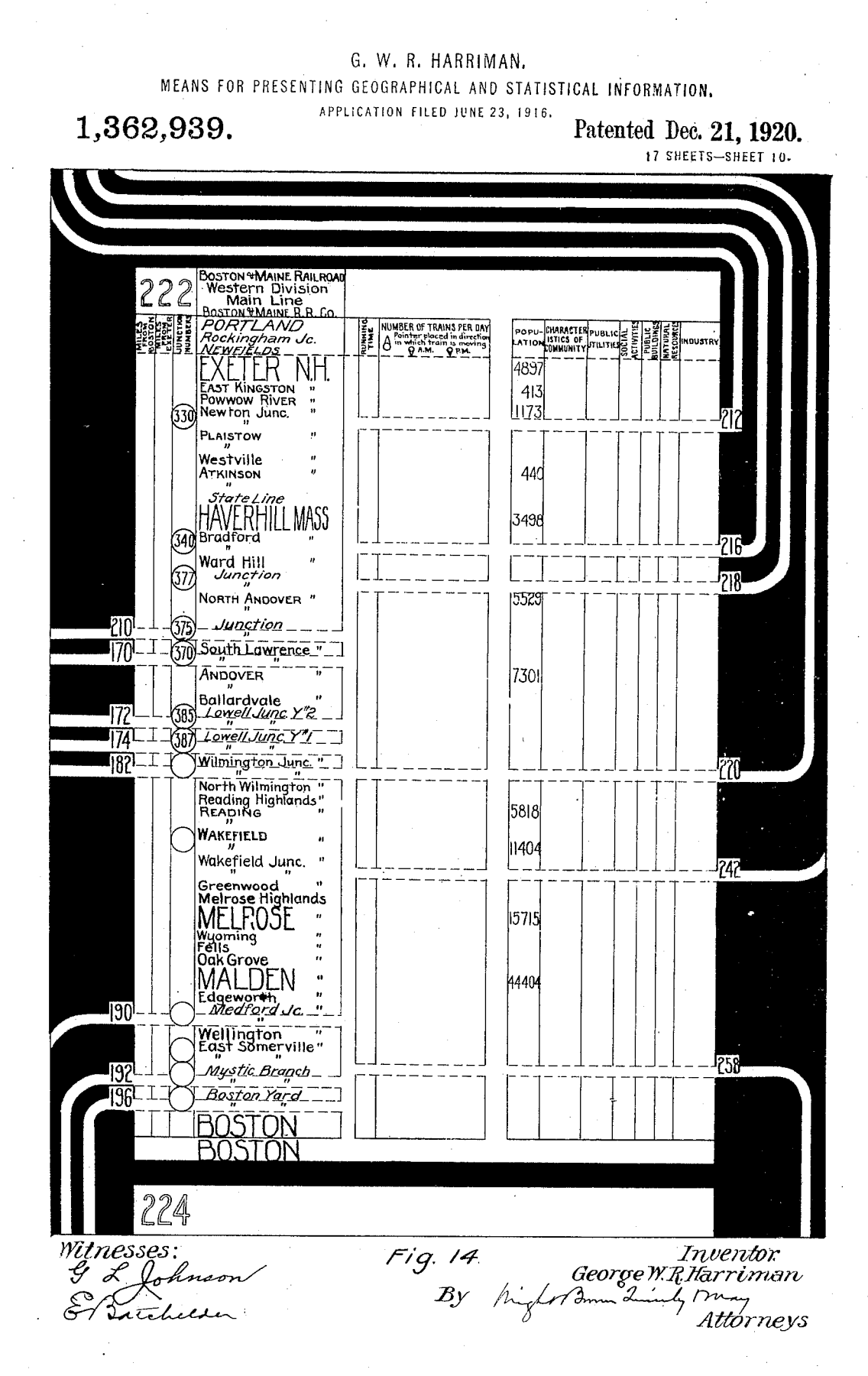

G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.

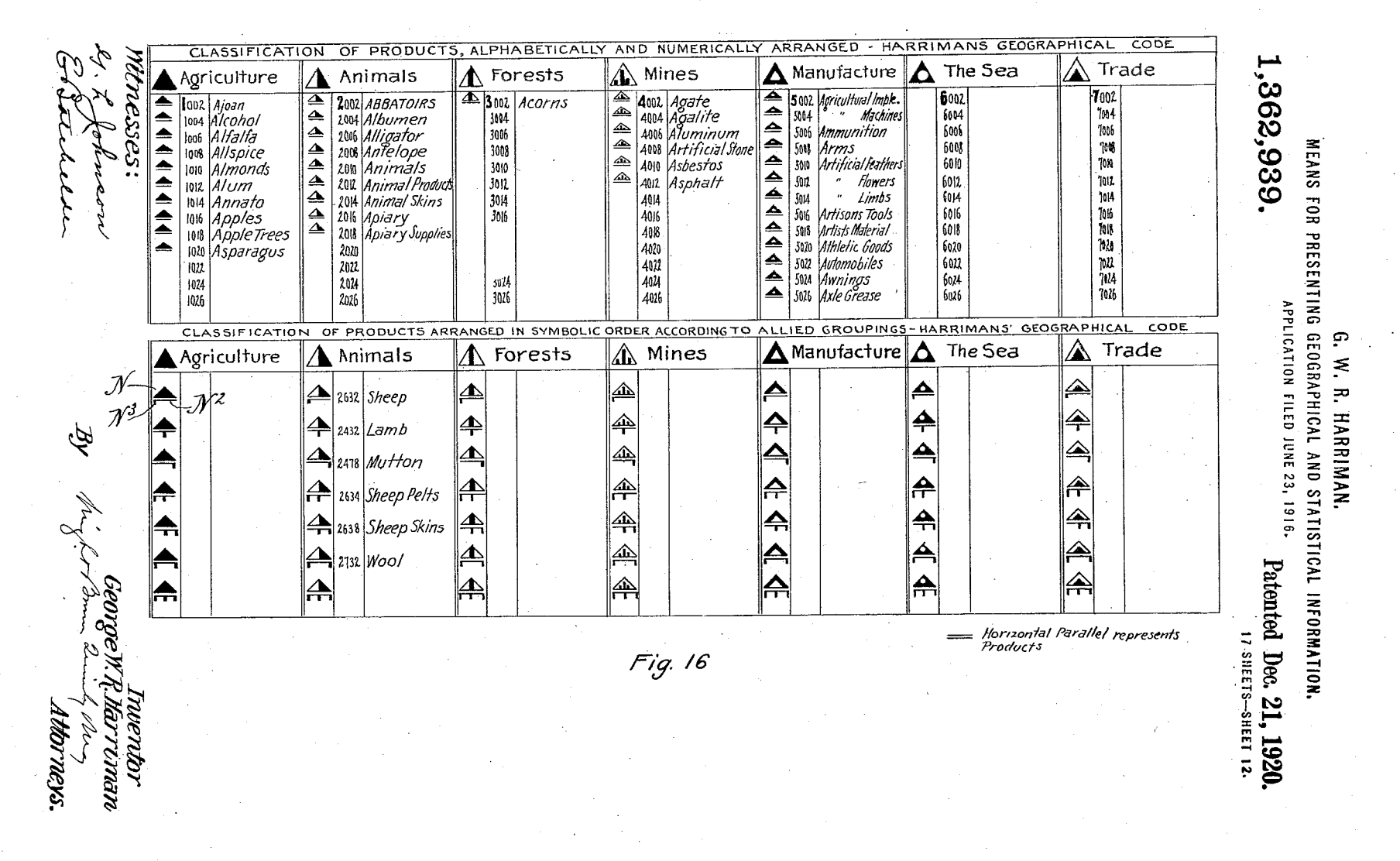

G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.
17 SHEETS—SHEET 12.

Fig. 16

= Horizontal Parallel represents Products

Witnesses:
G. L. Johnson
E. Batchelder

Inventor
George W. R. Harriman
By [signature]
Attorneys.

G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.

Witnesses:

Inventor
George W. R. Harriman
By
Attorneys.

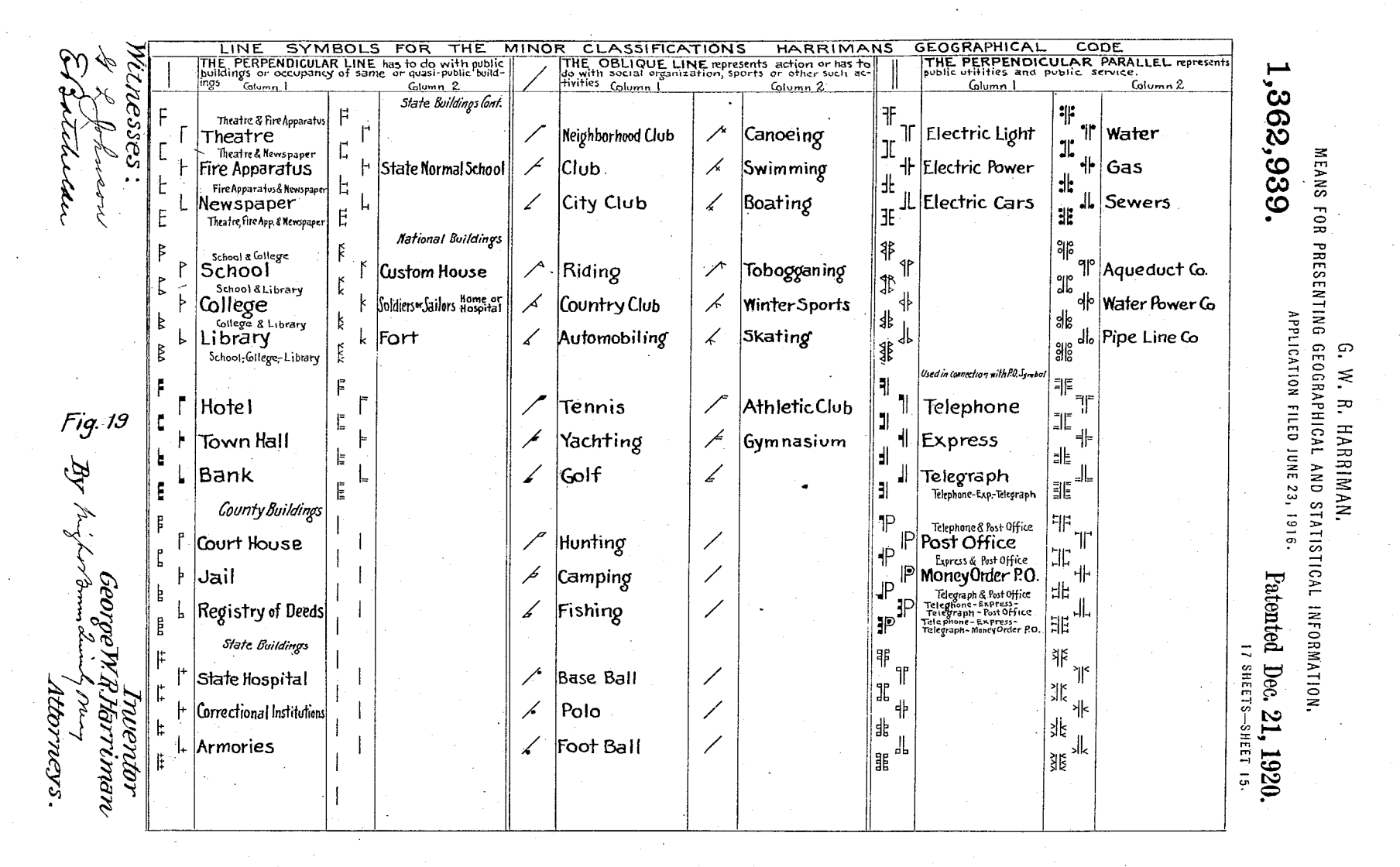

G. W. R. HARRIMAN.
MEANS FOR PRESENTING GEOGRAPHICAL AND STATISTICAL INFORMATION.
APPLICATION FILED JUNE 23, 1916.

1,362,939.

Patented Dec. 21, 1920.

G. W. R. HARRIMAN.
MEANS FOR PRESENTING GEOGRAPHICAL AND STATISTICAL INFORMATION.
APPLICATION FILED JUNE 23, 1916.
1,362,939.
Patented Dec. 21, 1920.
17 SHEETS—SHEET 16.
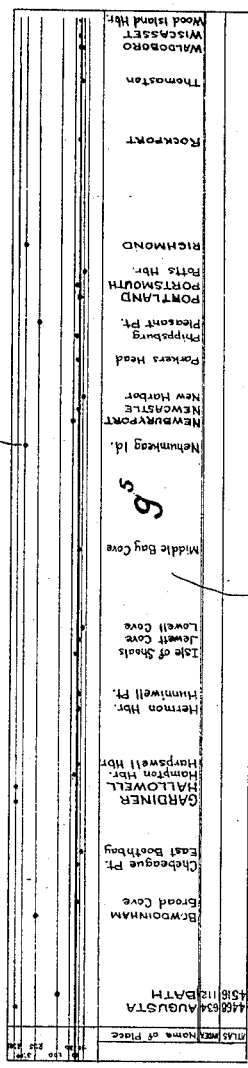
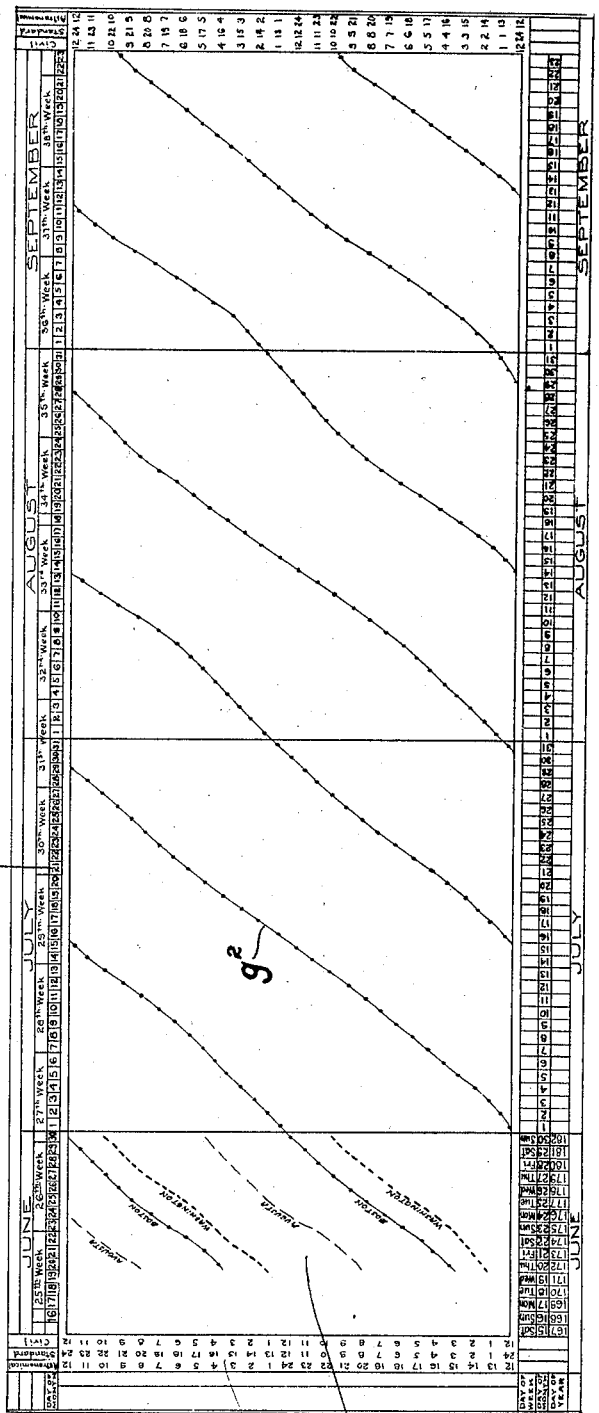
Fig. 20
Witnesses:
G. L. Johnson
E. Patchelsen
Inventor
George W. R. Harriman
By his Attorneys.

G. W. R. HARRIMAN.
MEANS FOR PRESENTING GEOGRAPHICAL AND STATISTICAL INFORMATION.
APPLICATION FILED JUNE 23, 1916.

1,362,939.   Patented Dec. 21, 1920.
17 SHEETS—SHEET 17.

Witnesses   Inventor
George W. R. Harriman
By
Attorneys

UNITED STATES PATENT OFFICE.

GEORGE W. R. HARRIMAN, OF MALDEN, MASSACHUSETTS.

MEANS FOR PRESENTING GEOGRAPHICAL AND STATISTICAL INFORMATION.

1,362,939.     Specification of Letters Patent.     Patented Dec. 21, 1920.

Application filed April 17, 1912, Serial No. 691,433. Divided and this application filed June 23, 1916. Serial No. 105,524.

*To all whom it may concern:*

Be it known that I, GEORGE W. R. HARRIMAN, a citizen of the United States, residing at Malden, in the county of Middlesex and State of Massachusetts, have invented new and useful Improvements in Means for Presenting Geographical and Statistical Information, of which the following is a specification.

This invention relates to a means for representing graphically and in condensed tabular form the location geographically of centers of population, political divisions, and other fixed places and establishments; the predominating characteristics of the same; the courses and lengths of channels of communication together with the ownership of such of them as are property; and information of general usefulness concerning the relations of natural and artificial features of the country, and the industrial, commercial and social development of communities and localities. The present application is a division of the one filed April 17, 1912, Serial Number 691,433 entitled Means for presenting geographical and statistical information, in which the matters here presented were originally described and claimed; my present object being to cover herein the matter divided from the aforesaid original application. More particularly the object is to provide means and apparatus for presenting graphically, and indexing in a manner such that they may be most readily found, the location of places or areas on the earth's surface, the routes by which such places may be reached, and their characteristics and facilities for business, social, and other purposes. In accomplishing this object I use in connection with the invention particularly set forth in my Patent No. 1,192,829, granted July 25, 1916, upon the aforesaid application, and also independently of said invention, a set of charts or delineators and graphic symbols, designed and exhibited to disclose the facts and conditions relating to specific localities, existing through natural causes, separately or in combination with the facts and conditions attendant upon and consequent to the activities or devices of man as regards each particular subdivision, or the latter separately and the relation each locality or subdivision bears to any or all other subdivisions of the world as above described, together with a system of delineators for recording the same, through a series or collection of charts, tables and diagrams arranged together in combination and correlation for ready cross-reference, in the several parts of such collection, and in a code system of numbers and symbols for expressing in condensed form the locations and characteristics of the places concerned. In one form for public convenience or distribution or reference this collection is bound together in a folder not unlike a pamphlet consisting of several leaves and pages, which is adapted to be folded into compact form in such a way that reference may be made readily and directly from one part to another.

In the several drawings accompanying and forming a part of this application, I have shown the folder itself and the several parts thereof, together with views of several component parts thereof in detail, a figure representing the principle or system of geographical subdivisions employed, and illustrations of the conventional symbols which I employ for presenting statistical information. In these drawings—

Fig. 3 is a perspective view of the folder showing the feature of construction thereof, by virtue of which the index may be brought into mechanical correlation with the other parts of the folder.

Fig. 4 is a perspective view of the folder opened wide, showing the relation between a transportation map which forms one element of the folder and a route chart which forms another element thereof.

Fig. 5 is a perspective view of the folder or pamphlet in the collapsed and doubled condition which it is adapted to occupy for convenient carrying by the possessor.

Fig. 6 is a perspective view illustrating the use of a screen for locating positions upon the map.

Fig. 7 is a representation of one of the many divisions of the earth illustrating the system of subdividing and indexing the earth's surface, which forms a part of my invention.

Fig. 7ª is a view of one of the maps.

Fig. 8 is a view of one of the divisions indicated in Fig. 7, which I term an "atlas unit."

Fig. 9 is a view of a route chart which forms an element of the pamphlet or folder.

Figure 10:
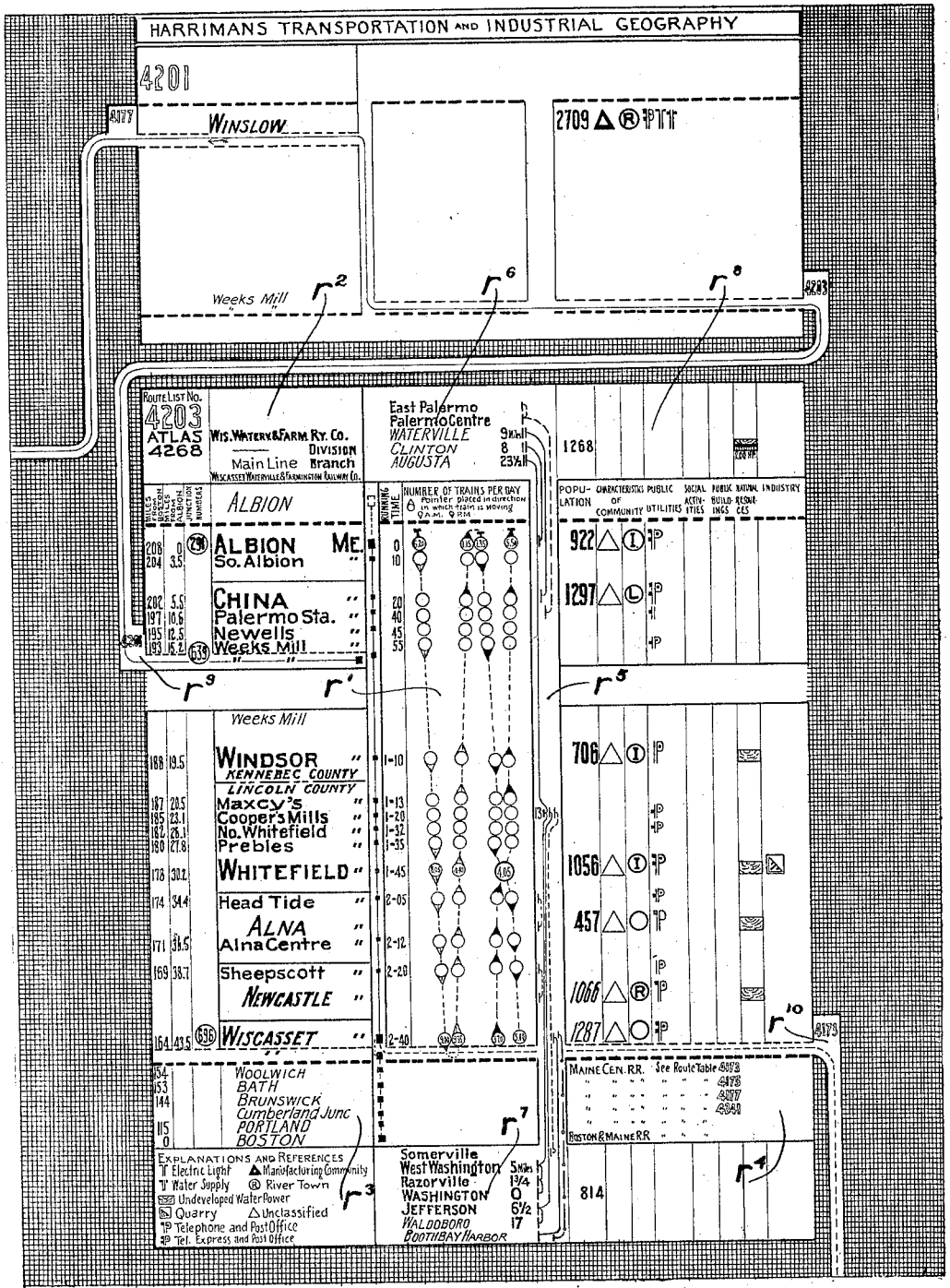

Fig. 10 is a view on an enlarged scale of the portion of the chart shown in Fig. 9.

Figure 11:
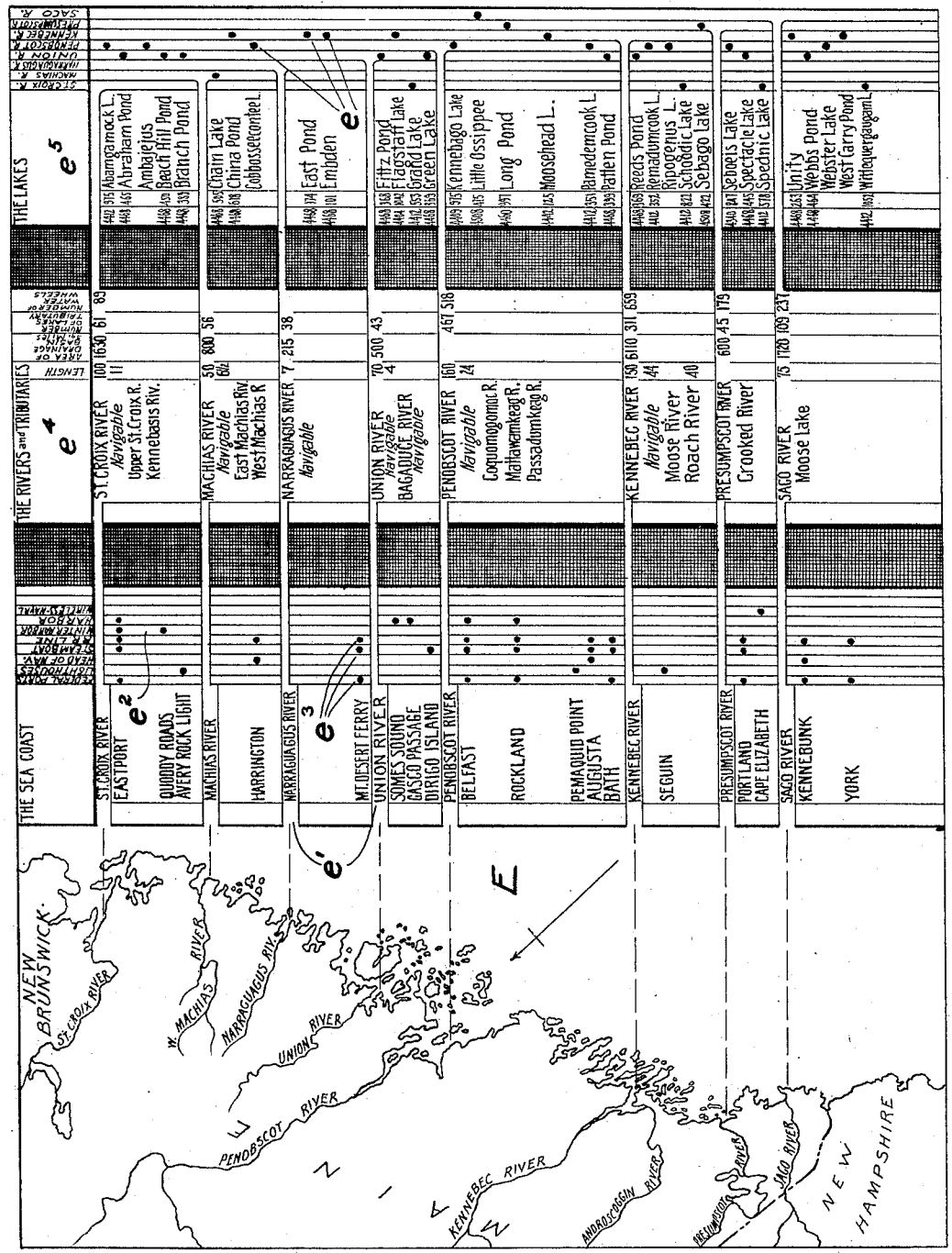

Fig. 11 is a view of a chart which forms a part of the pamphlet and serves to indicate the relations of lakes and rivers to one another.

Figure 12:
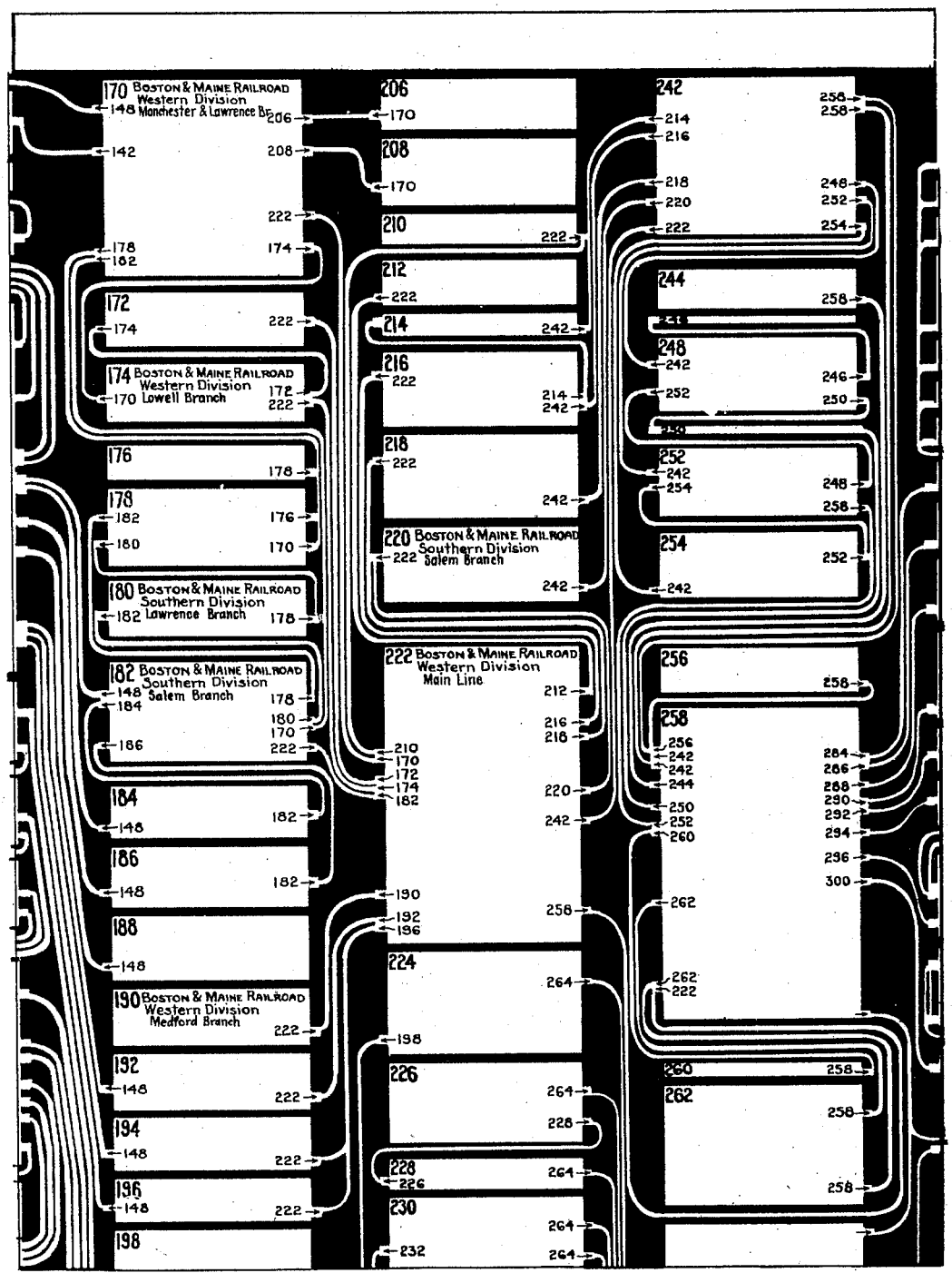

Fig. 12 is a route chart illustrating the application of the principles disclosed in Fig. 9 to another section of country.

Figure 13:
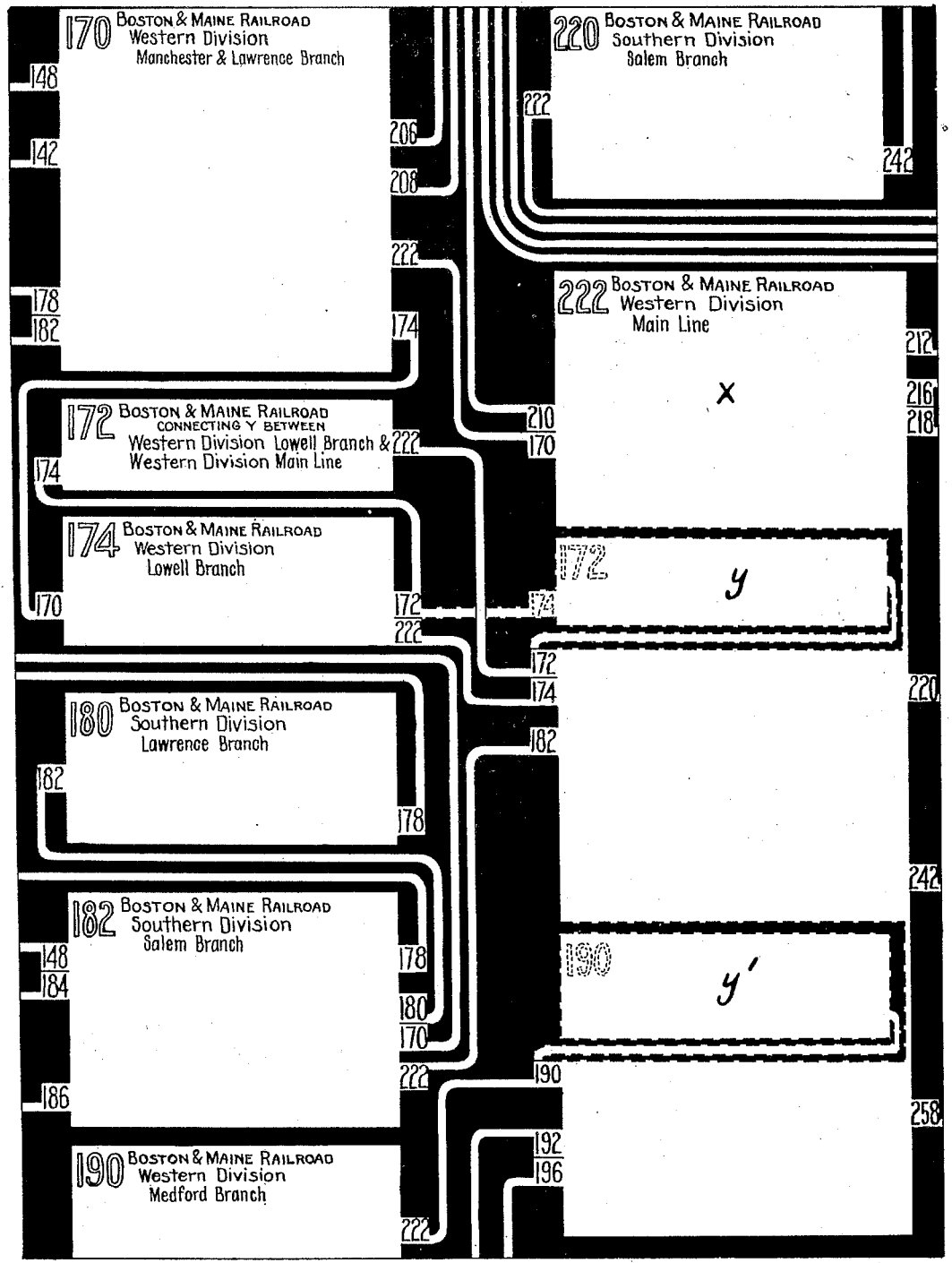

Fig. 13 is a view on an enlarged scale of a portion of the chart shown in Fig. 12.

Fig. 14 is a view on a still larger scale of one of the sections of the chart shown in Figs. 12 and 13.

Figs. 15 to 19 are sheets representing some of the symbols made in accordance with a system which I have devised for recording in condensed and graphic form certain statistical, geographical, industrial, and social information, and for classification of products.

Figs. 20 to 25 are enlarged views of charts published as parts of the folder.

The same reference characters indicate the same parts in all the figures.

I will first describe the folder itself and then explain the principles according to which the indications found thereon are devised. I apply the term "folder" to the device which I am about to describe because it is so made that it can be doubled or folded, as shown in Fig. 5, into a form and size adapting it to be slipped into a pocket and to be conveniently handled and kept. This term will be used hereinafter in the description. The folder here shown comprises a number of pages or elements, which, as they perform certain functions, as hereinafter described, I consider as contrivances or instrumentalities, preferably eight, although the exact number thereof is not material to the invention. The word "page" as used in this description is not necessarily limited to one side of a leaf, or to the leaf itself but is intended to cover any contrivance by which the functions referred to may be performed. The matter which it contains may be printed on both sides of a single sheet which is afterward folded and cut in the usual manner, the printed matter being so arranged as to come in the desired sequence on the pages. The first page carries an index on the right hand half in which are listed the names of the places in the political or other divisions of the country with which a particular folder is concerned. If the number of names is too great to be contained on the right hand half of the first page, the balance of the index is carried over on the left hand half of the second page. The index is indicated at A in Figs. 2 and 3 of the drawings, and that portion of it which is contained on the second page in Fig. 1 at A'. Other information of any desired character may be printed upon the balance of the first and second pages, the character of this being immaterial to the present invention. It is an important feature of the invention, however, that the index should be upon the part of the leaf which lies beyond the center fold from the binding for a purpose to be described. On the third page in the first and second columns, designated as B and B', I may provide information concerning transportation systems, such as steam and electric railways, lines of navigation, etc., giving in connection therewith the names by which the transportation systems are known, together with the names of the companies or persons by which the systems are owned. On this page also at B², I may print a physical or railroad map of the state or other political or natural division of country with which the particular folder has to do. On the fourth and fifth pages, I provide, respectively, a delineation or "route chart" C and a sufficiently large scale map of that section of the country which I term an "atlas unit," at D. It is not material as to which pages of the folder the chart C and map D are located, provided only they are upon contiguous and opposite pages, so that when the folder is spread open the chart and map are disclosed at once so that reference may be had from one to the other.

Figure 1:
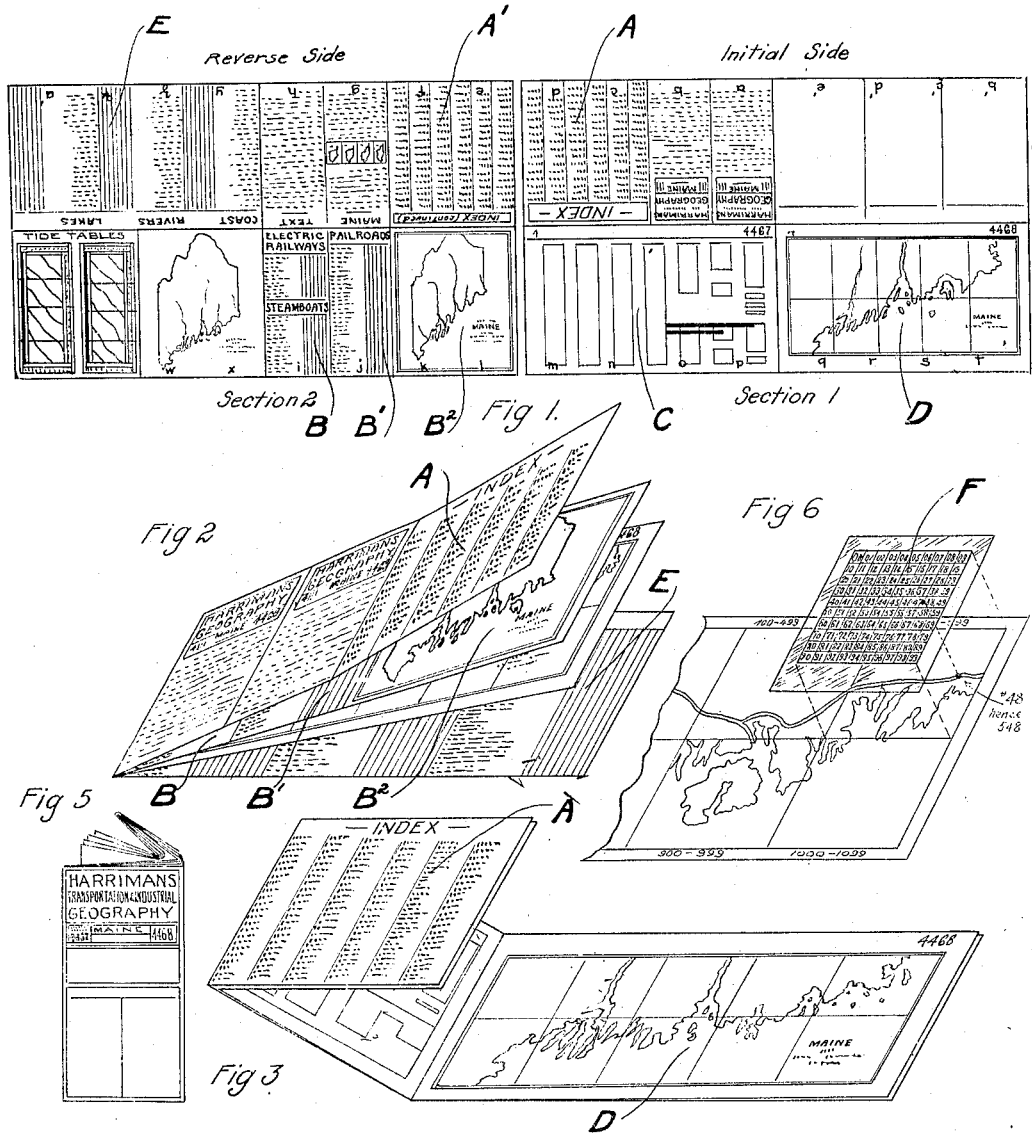
Figure 1 is a view showing the sheet out of which the folder is made, prior to folding, and representing the two opposite faces of such sheet.
Figure 2:
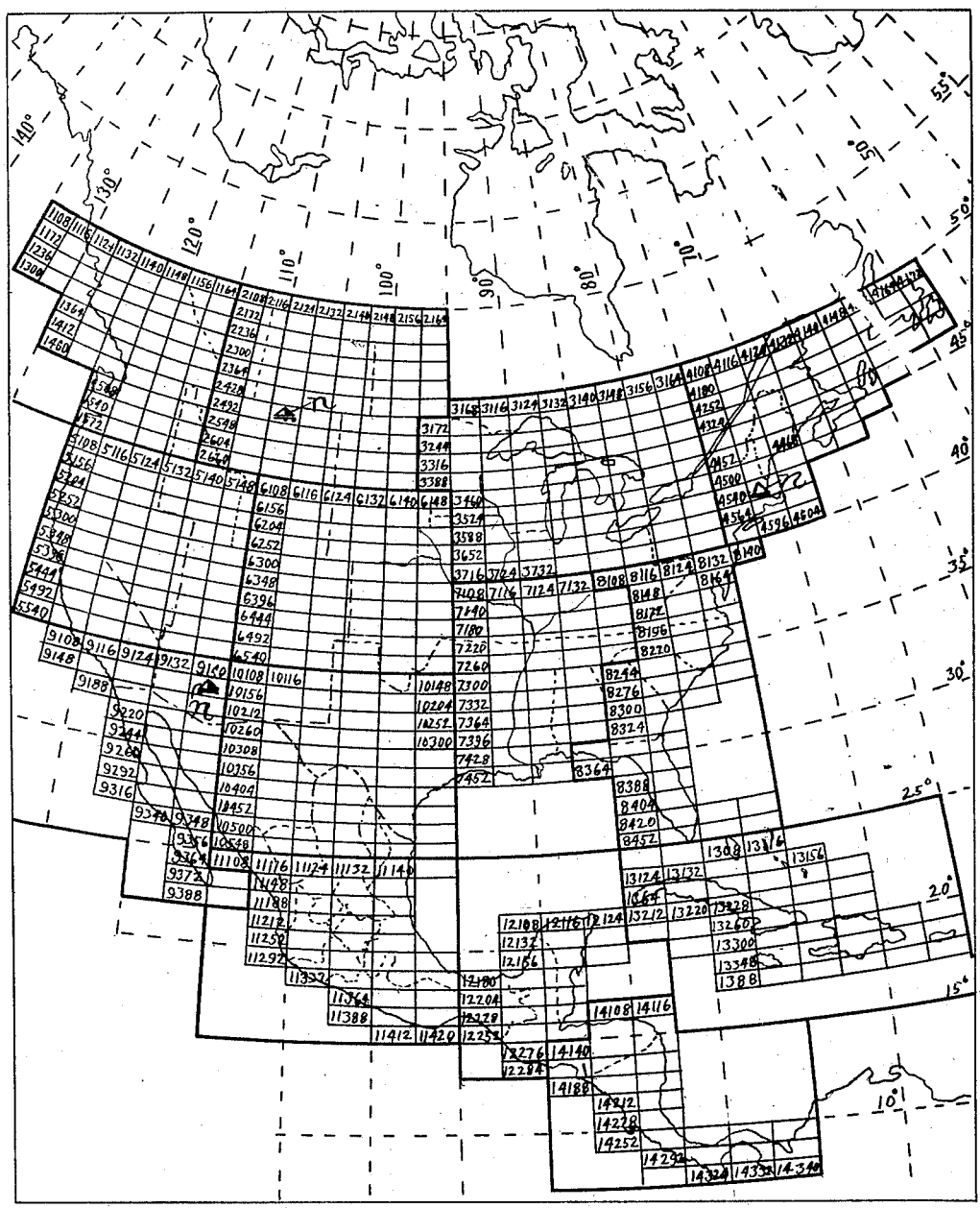
Fig. 2 is a perspective view of the folder or pamphlet properly assembled together and the leaves cut.

Another of the pages, indicated at E, in Figs. 1 and 2, contains a chart on which are the names of rivers arranged in an order and spacing corresponding to their geographical location, the lakes of the territory with which the folder is concerned and the relation of such lakes with the rivers, and a list of the salient features of the sea coast of the region concerned, when such region has a sea coast. The features above particularly described and also the means in the nature of symbols, hereinafter described, for classifying industries and products, contain the important parts of my invention, other matter which may be printed on the folder being of any desired character and containing any desired information, with which the present invention has no concern.

I have heretofore used the term "atlas unit" in connection with the map D. I will now describe the meaning of that term, and the manner in which atlas units are distinguished from one another. Figs. 7, 7ª, and 8 especially illustrate this part of the invention. An atlas unit within the terms of this invention is a quadrangular area of the earth's surface inclosed between lines of longitude and latitude. Each atlas unit has its own distinctive symbol. I have chosen for convenience, and have here illustrated, a series of such units each comprised between parallels of latitude one degree apart and between meridians of longitude two and one-half degrees apart, but without intending to limit the invention to these precise dimensions. I have further defined collections or groups of atlas units by group or regional boundaries, which may be coincident with the boundaries of the atlas units, or may cut some of such units. Each group or region, or major division, however, includes several atlas units. The designating symbols for the several atlas units are all different, but those applied to all of the units in a single group or major division have some characteristic in common. I have adopted for illustration here numbers consisting of four or more digits for such symbols, and have made one of these digits the same in all of the symbols employed in any one major division. The first digit where the number consists of four digits, and all except the last three where it comprises more than for digits, constitutes this common characteristic, and is termed the "coefficient" of the symbol, the last three digits being considered as the "character." It is to be understood of course that such symbols including the coefficient and character need not necessarily be Arabic numerals, but may be of any other character. Adjacent numeral symbols here adopted differ from one another by eight units, whereby the system of numbering adapts itself to be used in a series of eight page folders, each folder containing a map of one of the index units on one page and having other information on the other pages. This method provides for a series of folders having consecutively numbered pages comprehensive enough to include all of the unit areas of the entire earth.

I further divide each unit area into smaller divisions which I call index squares and designate by individual distinguishing symbols also. Fig. 8, showing a large scale map of one of the atlas units, illustrates my preferred means for delimiting and indicating these index squares. First the atlas unit is divided, as shown by lines of dashes into regional quadrangles of one half degree in each direction, and the said regional quadrangles are further divided into ten parts in each direction to form index squares of three minutes of breadth in each direction. The index squares or quadrangles are designated by numeral symbols running from zero to 99 in each regional quadrangle, and have coefficients which are applied according to the location of the regional quadrangle in the atlas unit, as clearly shown in Fig. 8, and as more fully explained in my Patent No. 1,192,829 aforesaid. I also prefer to provide marginal indices along the margins of the atlas unit map, such indices being numbers applied at the heads of the columns, and beside the rows, of index squares, as shown in Fig. 8. The row numbers may run in repeated series in ten unit intervals from zero to 90 and the index numbers at the heads of the columns may run in repeated series from zero to 9 in unit intervals, thereby furnishing easily understood and readily used means for determining the numeral symbol adopted for the several squares in each major quadrangle, thus making it unnecessary to apply the symbol directly on the face of the map upon the corresponding index square. I may also use as a means for locating any specific indicated index square, a transparent screen, such as that shown at F in Fig. 6, having an area approximately equal to the map area of either the entire atlas unit or one of its divisions, and being subdivided into index square areas, and bearing on each of these areas the corresponding index square number.

The foregoing explanation is given to illustrate the principle of this feature of the invention without intention to limit the same otherwise than appears from the following claims.

It will be seen that the means of symbol identification of localities above described provides a system of identification which is fixed and absolute, but not arbitrary, because it corresponds to the actual geographical locations of the places. The numerical system is flexible and leaves room to accommodate symbols for new settlements and establishments to exactly the same extent that the surface of the earth has room for the physical presence of such establishments, and thus no matter how many new settlements may be established, or wherever they may be located, the designating symbol is automatically ready to be applied. The code system is thus fixed for all time.

Preferably the atlas unit number is placed on the map in connection with the most important city or town located within that unit. The location of the city is designated by a large circle within which the atlas unit number is printed and the name is printed beside the circle in prominent type. Other places when they are junction points of railroads are identified by their index square numbers contained within the circles which fix their locations.

The map of a political or natural division of country, such as that indicated $B^2$ in Fig. 2 which represents an entire State, may and in this instance does, contain several atlas unit divisions. On this map the several atlas units are indicated by division marks which follow the same geographical lines of longitude and latitude as are indicated on the map of Fig. 7, and are plainly designated by the proper symbols, which are the same as in Fig. 7. The margins of said map bear index numbers in repeated series running from left to right from zero to 9 at unit intervals, and from top to bottom from zero to 90 with ten unit intervals, in the manner described in connection with Fig. 8, which are placed between the atlas unit division lines with a spacing corresponding to the spacing on Fig. 8 and allowing for the difference in scale, as shown clearly in Fig. 7ª.

Figure 18:
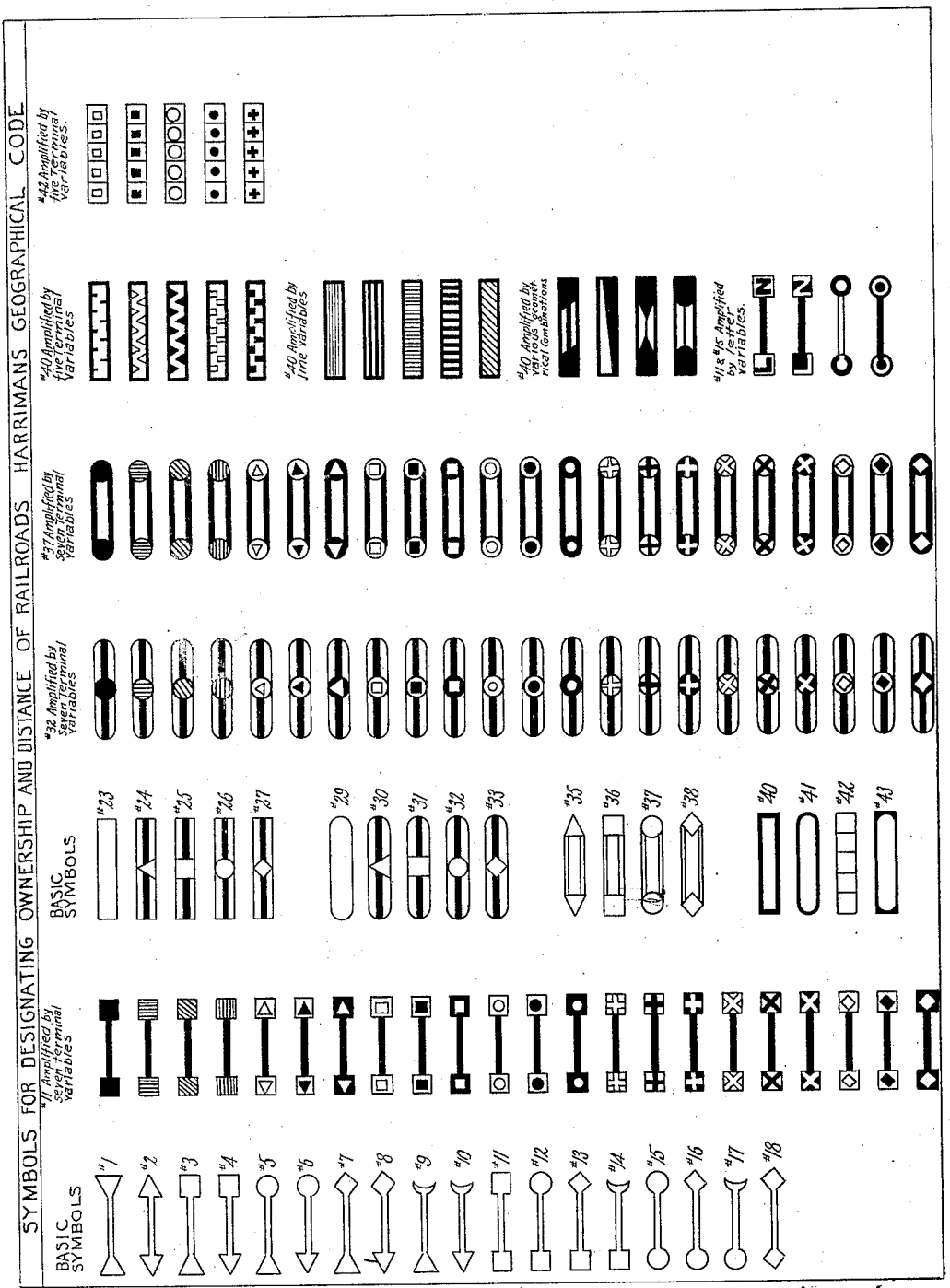
Figures 23, 24:
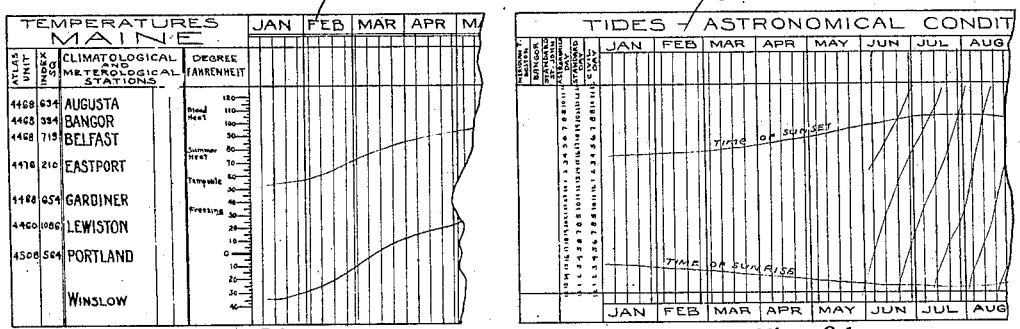
Figure 25:
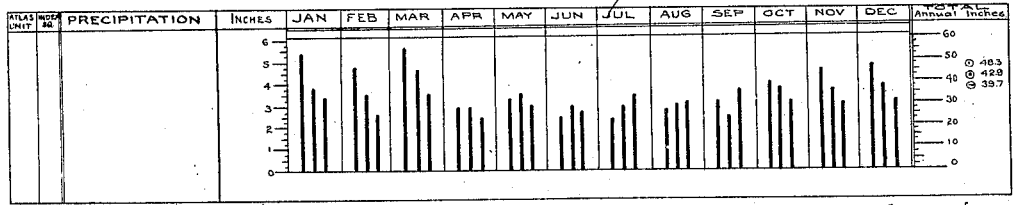

As my invention has to do not only with the tabulating of physical conditions but also with operating conditions, including the time element, or a means for transportation from place to place, and with financial conditions or ownership of such means, I show prominently on the map the roads and the ownership thereof. The representation of railroad locations is made by double lines, one of which is designated in Fig. 8 by the character *a*. Ownership of railway lines is indicated by symbols *b* and *c* in the right hand part of Fig. 8. It will be noted that these symbols are equal in linear extent and that duplicate symbols are arranged end to end on one line. The symbols are drawn to accurate scale in length and designate the mileage of the line of road, the distance from any symbol to the corresponding point in the next symbol being a certain number of miles, conveniently, ten miles. By counting the number of these symbols and fractions thereof between any two places, the railroad mileage between these places can be quickly and accurately determined without the trouble of scaling off the total length of what may be an irregular line on the map, or looking up the mileage in a railway publication. By comparing the symbols *b* and *c* it will be seen that they differ in form, the symbol *b* consisting of a heavy line with rectangular enlargements at its ends and the symbol *c* a similar line with circular enlargements. These are two of a practically unlimited series of different symbols, each of which designates a certain ownership. All the symbols employed in any one folder to designate ownership will be explained by a key forming a part of the folder. Some of the various symbols which can be made with different combinations of permanent forms with variables are shown in Fig. 18 of the drawings accompanying this application. It is intended of course that every line of railroad in the published map shall be shown with symbols of this sort, but for convenience and clearness they have not been so shown in Fig. 8, only a sufficient extent of the lines being provided with symbols to explain this aspect of the invention.

The locations of cities, towns, villages, and other establishments along the lines of communication are indicated by symbols which denote the predominating characteristics of such places. I have adopted for these symbols the geometrical forms of the triangle, circle, and rectangle, either singly or in combination, which according to established meanings given to these symbols, as fully shown in Fig. 17, show succinctly the predominating characteristics of the place in the respect of natural resources, principal products or activities, industrial establishments, and governmental or operating features. As the invention has largely to do with showing feasible lines of transportation and their terminations, I indicate such terminations in the case of navigable rivers by placing the symbol designating the location of any town which may be at the head of navigation so that it crosses the representation of the channel of the river, as indicated at *d* and *e* in Fig. 8. All commercial facilities for transportation are indicated on the map, including not only railroads but also established lines of ships, indicated at *f'*, stage lines, one of which is indicated at *g*, and electric railways *f*. It will be noted that beside the lines of communication I have placed numerical indications *g'*, consisting generally of a number expressed in Arabic figures, followed by a Roman numeral. These characters designate certain distinct routes and are used in connection with the route chart, which I will now describe.

The device above referred to by the term "route chart," which is also a route indicator, and is to be understood as so designated whenever the term "route chart" is used in the following description, is shown in detail in Fig. 9, a subordinate section of such chart being further shown on an enlarged scale in Fig. 10. This chart represents conventionally all the commercial lines of communication, and is designed to show graphically the means by which the places located in the atlas unit may be reached. The stations on railways, stage lines, and navigable water ways are plotted in the route chart in positions corresponding in a general way to their geographical locations, but also in such a way as to economize space. The stations on each line, that is, either a main line or a branch, are placed in a column inclosed by heavy lines or boundaries in which openings are left to show the only means of communication therewith. For instance, in the second column in Fig. 9, I have shown a column of place names which represent the stations on a main route, and at the top of the column I place the route number, which in this instance is 4177 and corresponds to the same number in Fig. 8 (see the numeral indicated *g'*). The Roman II following the above noted route number in Fig. 8 indicates that this route is placed in the second column on the route chart. Lines of railroads are indicated conventionally at *i* and *j* in this column of Fig. 9, and upon these lines are placed black squares indicating the stations, the names of many of these stations being omitted from Fig. 9 in order not to confuse the drawing. It is to be understood that in the published chart the names of all the stations will be printed. The column is inclosed by boundaries $k$ and $l$ in which at certain points openings or breaks are made which show that communication at these points may be had by means of branch lines with outlying parts of the country. The names at the foot of the route chart designate the ultimate terminals of the line, which are outside of the boundaries of the particular atlas unit treated in the folder.

In the first column of the chart are designated branches $m$, $n$, $o$, and $p$ which are inclosed between the boundary $k$ and opposite boundary $k'$ and intermediate boundaries $k^2$, $k^3$, etc. Each column is thus boxed in as it were, except for the breaks or openings $m'$, $n'$, $o'$, and $p'$, in certain of these boundaries. The breaks referred to show where the branch line connects with the main line and indicate the only commercial channels by which the places thus boxed in may be reached. The names of the stations on the branch lines are contained in the spaces $m$, $n$, $o$, and $p$, and in addition such spaces contain the names of the junctions at which these branches connect with either the main line or another branch line, the latter names being printed in a different character of type or otherwise distinguished (as by an arrow) to show that they are repeated and carried into the branch columns from the main line columns where they properly belong. Thus in the space $m$ appears the name "Oakland" printed in a different manner. By following the break or passage $m'$ in the inclosing boundaries it will be found that Oakland is also in the branch represented at $p$ and that it is the junction point for the branch $m$. Also in the branches shown $n$, $o$, and $p$ the names "Newport," "Pittsfield," "Waterville," are distinctively printed and these names are repeated on the main line in type of the same character as other places on the main line. Thus the names so distinguished show that the places corresponding thereto are the junction points at which the branch lines join other lines.

The inclosures contained between the boundaries $l$ and $l'$ in the third column of Fig. 9, and further separated by intermediate boundaries are other branches, identified by the route numbers corresponding to the lines shown in Fig. 8. The connections between these branches and other branches on the main line are indicated in exactly the same manner as above described. It will thus be seen that my graphic mode of representing routes of overland travel on the route chart shows immediately and accurately all the ways in which places on any line may be reached from any other point. The boundaries indicate that the places are inaccessible by established means of transportation except through the channels indicated by the breaks in the boundaries, and where the actual railway lines are indirect and pass through junction points, these conditions are shown by the channels on the route chart. Such a condition as last indicated is exemplified in the branch shown at $q$ on Fig. 9, which is given the route number 4201. There are two railway connections to this branch, one of which connects with the main line $i$ at Winslow and the other makes a junction at Week's Mill with a branch having the route number 4203 and shown at $r$ in Fig. 9, which latter joins at Wiscasset with a line between Rockland and Portland having the route No. 4173.

Corresponding conditions relating to water transportation are also shown on the route chart where the characters $s$, $s'$, $t$, $t'$, and $u$ represent rivers, bays, and the sea, the shores of these bodies of water and of islands being represented conventionally, and the names of ports being applied adjacent to the shore lines in positions according generally to their geographical locations. Boat lines are represented in these water ways by means of lines $f'$ which correspond to the lines $f'$ on the atlas unit map, and the ports at which ships of these lines touch are indicated by dots placed opposite the names of the ports. Where dots on two or more lines are placed opposite the same place name, as indicated beside the names Rockland, Bar Harbor, and others in Fig. 9, it indicates that connections may be made at these places between boats.

The route chart conveys graphically and at a glance the information which can not be given by the map alone, for it not only shows the general directions and distances of lines, but it also affords provision for displaying statistical and other information relating to the places named, the transportation accommodations, and other information. This is illustrated in Fig. 10 which shows an enlargement of the branch contained in the space $r$ of Fig. 9, and presents matter which the scale of Fig. 9 is too small to permit being shown in that figure. Referring to Fig. 10 it will be seen that said figure contains the information shown at $r$ in Fig. 9 together with additional information. Thus $r'$, Fig. 10, shows a table representing the number of trains per day on the branch and the running time between stations. The stops of the trains are designated by circles placed opposite the place names, and the direction in which the trains run is indicated by converging lines on one side or the other of these circles. These converging lines also indicate according as the space between them is blank or is filled with solid color whether the train is operated in the forenoon or afternoon. By means of the lateral spacing of these lines also the times at which the stops are made are approximately indicated. At the head of the column in a space $r^2$ is shown the name by which the road is known, or the name of the operating railroad, and also the name of the corporation or person by which the railroad is owned. At the foot of the column in the space $r^3$ are contained the names of places with which railway connection may be made from the branch, and opposite to the names, in a space $r^4$, the names of the connecting roads and the route numbers thereof. In a column $r^5$ are placed graphic representations of stage lines on which are symbols designating termination opposite the names of places at which they start and end. The names of the places off the line of the branch railway with which these stage lines connect are given in the spaces $r^6$ and $r^7$, those places to the north and east of the railway being in the space $r^6$ at the top, and those to the west and south being in the space $r^7$ at the bottom of the column. Still further information is given in a series of columns $r^8$, such information being in the nature of population, characteristics of the communities, public utilities and buildings, social activities, natural resources, industries, and products, etc., such information being given by means of symbols explained in Figs. 15 to 19, which are developed according to a system which I have originated and which forms a part of this invention. It will be noted in connection with Fig. 10 that numbers are placed at the openings $r^9$ and $r^{10}$ where channels of communication with other lines are indicated. These numbers are the route numbers of such other lines with which communication is made. It is to be understood that the route chart represented in Fig. 9 is to be of such a scale in the published folder, not (necessarily so large a scale as Fig. 10) that such data as are shown in Fig. 10 may be placed beside all of the names shown on the chart.

From the foregoing it will be understood that that aspect of my invention which relates to the route chart consists of a means by which all the facilities and the only facilities for getting from one place to another are presented to view, so tabulated as to indicate the comparative ease or difficulty and the length of time of making such a trip, and all information that would be of influence in determining a person to locate at a place for business or pleasure.

The chart thus enables one to determine at once the best route for transportation of freight or for traveling, where more than one route is available, and the system of numbering the routes and lines provides designations by which the lines over which the passengers or freight are sent may be accurately and concisely stated upon tickets and tags. This system of route numbers taken in conjunction with my code system of designating places thus gives a practically universal code language in terms of which shipping and receiving points and the roads over which goods are carried are expressed. Each line and branch line of railroad, and each line of ships is given its own distinctive route number, which is so chosen as not to conflict with the number of any atlas unit, but of which the first figure, or the coefficient, is the same as that of the geographical major division of the country in which the line is located. That is, all the transportation lines and all the atlas units in any one of the major divisions of the land heretofore described have the same coefficient number. It is my purpose to have all the freight cars owned by any railroad marked permanently with the route number of that road whereby the coefficient of that number shows to car handlers in all parts of the continent, who need be equipped for the purpose with nothing more than a chart like that in Fig. 7, containing the atlas unit numbers, the regions in which such cars belong, and the directions in which returning empty cars should be moved.

The route chart and atlas unit plate coöperate with the index in finding the route to be followed in order to go from some principal center to any obscure place. The name of the place to which the route is desired is first looked up in the index A being found in its alphabetical placement there. The atlas unit number and index square number are given in the index, from which its placement on the atlas unit map may be found. Turning from the map to the route chart the name of the place is given in substantially the same location on the chart as on the map and from the latter the route to be followed in going to or from the center can be found. I should mention in this connection that on the index I print opposite the name of each place the number of the route or line on which the place is located as well as the geographical placement numbers. The map and route chart used in conjunction with one another furnish a greater amount of aggregate information than can be obtained from using the map and chart separately. It might be said that the coöperation of the chart, map, and index, with the several graphic symbols thereon constitutes a means or apparatus for conveying directly information of a sort which could not be conveyed by words. That is, the relations of all items of this information to one another could not be conveyed in words, whereas these relations are instantly made apparent to the user of the apparatus when arranged according to the principles here set forth.

Turning to Figs. 12, 13, and 14, I show a route chart of another section of country in which only rail lines of transportation are utilized and such lines are much more numerous and close together. The same principles explained in connection with the description of Fig. 9 are exemplified here, each branch or section of railroad line being contained in a separate inclosure from which openings or passages lead to other inclosures. Figs. 12 and 13 are on too small a scale to show the names of the places on the lines, only Fig. 14, which shows an enlargement of a section near the center of Fig. 12 being on a sufficiently large scale for this purpose. It will be noted that beside the entries to each of the passages referred to the number of the section of road with which a connection is indicated by such passage is given, and all the spaces indicating sections of a road are numbered, the principle according to which this is done being as heretofore described in connection with Fig. 10. The practice which I prefer to follow in these charts is to make the main line continuous and indicate branches at one side or the other thereof as nearly as possible in positions corresponding with their geographical locations. I may modify this principle, however, as indicated in Fig. 13, where the space $x$ indicates a part of the main line and the space $y$ a branch line which is interpolated between stations on the main line. $y'$ is another branch interpolated in the same way. The foregoing description enables a further explanation to be given of the tables shown at B and B' on the second page of the folder which contain the lists of the electric railway, ships, and steam railways, or in other words of the established transportation lines. The tabulations consist of a list of the several physical lines, those which are related physically in operation being arranged under the heading of the operating company, each line or branch which has a separate corporate entity being identified by its corporate name under the name of the operating company. In parallel columns there are placed beside the names of the several owning companies or persons the names of the places from which the line or branch respectively starts and ends, with the atlas and index square numbers of these places, whereby the same may be readily found upon the map. In another parallel column are placed the route numbers of the several lines. It is to be observed that the leaf bearing the table of transportation lines is hinged or folded similarly to the leaf bearing the index and that the table of transportation lines is on the same side of the leaf relatively to the side of the leaf on which the atlas unit is placed. In this instance, however, the table is placed between the fold or hinge and the binding. By means of this the hinged part of the leaf may be folded under and the table of transportation lines placed beside the atlas unit as an index. In a similar manner owing to the flexibility and folds of the other leaves, the table of transportation lines may be in juxtaposition with and as index to, a supplementary or interpolated leaf or sheet hereinafter described which I may provide for presenting information concerning bond issues and other financial data concerning these lines. In fact any part of the folder is an index to any other part, and the flexible character of the folder enables any of these indices to be placed beside and viewed simultaneously with the other part to which it has reference. Hence I do not limit the application of the word "index" as used in certain of the claims, to the list of places at A and A' alone.

Figure 15:
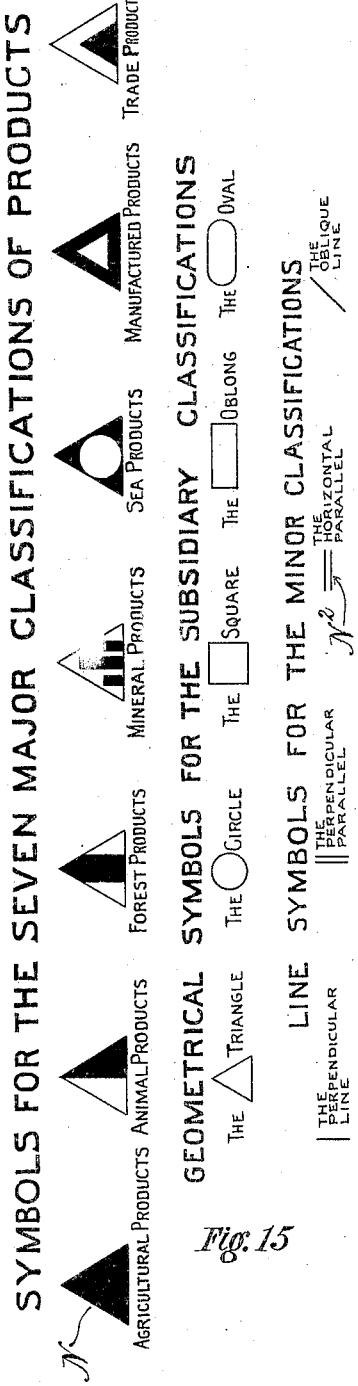

In further explanation of the classification symbols mentioned in connection with the description of Fig. 10 and the portion $r^8$ thereof, attention is directed to Figs. 15 to 19, inclusive, and particularly to Fig 15, which shows the elements which I combine to form various identification and classification symbols. These symbols are preferably geometrical forms, of which all those applied to the major classes (identified by the character N in Fig. 15) have similar outlines, their distinguishing differences being internal. These major symbols are combined with one or another of the line symbols ($N^2$) for minor classifications and of the terminal variables ($N^3$) to apply to individual and final classes or titles of trade products, some of which are shown in Fig. 16. Various combinations of these elements provide an ample number of distinctive symbols to designate all known natural and manufactured articles of commerce. Appropriate symbols of this character placed on the maps or charts (as at $n$ in Fig. 7) show the principal products, or those of interest for some particular purpose, of the places corresponding to the locations of such symbols on the maps, and serve as a means for informing and aiding manufacturers and merchants to determine the economic locations of their establishments as regards transportation of raw products from the centers of manufacture and thence to the consumers' markets.

I will now describe the chart or delineator heretofore referred to and designated by the character E, said chart being shown on a larger scale in Fig. 11. It is provided in furtherance of the general objects of my invention, namely, to provide accurate and related information expressed in logical and orderly sequence having value, both educationally and commercially as a means to assist operations of transportation. On this chart I provide spaces, $e'$, designating rivers which discharge into the sea, confined between boundary lines which are spaced proportionately to the geographical locations of their river mouths, and between these river locations are noted the names of distinguishing features of the sea coast also arranged in accordance with geographical locations. Following these names are columns $e^2$ at the heads of which are legends giving information of value to mariners, shippers, and others and in these columns opposite the names of the places on the coast are set dots $e^3$ indicating the places to which the data at the heads of the columns relate. In a further column $e^4$ are placed the names of tributaries of the several rivers indicated in the spaces $e'$, the tributaries being collected together with the main rivers into which they empty and distinguished from the tributaries of other rivers by dividing lines. In still another column $e^5$ is a list of lakes of the region with which the folder has to do, arranged in a predetermined order, preferably alphabetically, in connection with means showing the rivers into which the several lakes discharge. The means last referred to consist of channels or columns running parallel to the column of names, each corresponding to one of the rivers and each connected with the space representing the river to which it refers by merging of its boundary lines with the boundaries of such space. Dots $e^6$ are placed in one or another of these columns or channels beside the names of the lakes which respectively discharge into the rivers corresponding thereto.

Referring again to the representation of the folder in Fig. 1, and to Fig. 20, in connection therewith, I show upon one of the pages of the folder a chart G of tides plotted for certain base points upon tide water for every day during a predetermined period, and in connection therewith an index G' by which the condition of the tide at other points may be determined. On the tide chart lines $g^2$ are plotted on coördinate lines, of which the ordinates are hours of the day and are indicated on the left hand margin of the chart at $g^3$ and the abscissæ are the days of the year and indicated on the longitudinal margins $g^4$. The index G' contains the names of places of which the conditions of tide are reckoned from one or another of the base points. On this chart the heavy line $g^5$ is the base line, and the dots $g^6$ opposite the several place names indicate, with reference to the time indications at the head of the column, the time differences between the places opposite which the dots are put and the base point of the same tide conditions. According as the dot is below or above the base line, the condition of tide at the place in the index is earlier or later in point of time than the same condition of tide at the base point. The spaces between the base line and the dots are plotted in the same scale as the ordinates $g^3$ of the chart G. By measuring the distance between the base line and the dot opposite in one of the names on index G', and then measuring this distance from the plot $g^2$ on chart G, the time at which high tide occurs at any day in the future for which the chart is made, at the place designated, may be determined.

Figs. 21, 22, 23, 24, and 25 show charts which may be applied on one or more supplemental or interleaved sheets of the folder which embody the principles of the chart of Fig. 20 to the extent that absolute time points or dates are factors in the expression of information. In all of these five figures the indications longitudinally of the chart, which are designated by the reference character $g^7$ are in terms of days and months of the calendar year. The information furnished on the charts is plotted therein and may be of any character relating to the places and corporations listed in the index and in the tables of transportation systems appearing in the folder and heretofore described. These sheets when made part of the folder are related to the indexing tables in the manner heretofore described in connection with other features of the folder, in such manner that the intermediate leaves may be folded back and the index or tables placed beside the charts. The fundamental principle of the plots on these last described charts is the same as the principle of tabulations on the route sheet, which are shown in detail in Fig. 10, in that they furnish graphically information concerning operating and financial aspects of places and public utilities, in easily appreciated sequence and correlation.

Although as I have hereinbefore described at some length the uses to which the charts and other portions of the folder in which my present invention is embodied may be put, and the character of the information to be derived therefrom, yet I desire to make it distinctly understood that I do not claim patent protection for any such use or any particular information thus presented, but that what I do claim is a means or instrumentality by which any information of the character indicated, may be presented to the mind of the user as an entity and in proper and logical correlation of one part with another. The principles in which my invention resides are not restricted to the limited expressions of conditions affecting any particular section of country but may be adapted to, and made use of for, tabulating and setting forth the characteristics and conditions of any and all countries, regions, and districts. Therefore what I desire to protect by patent is not the result of intellectual labor in collecting and setting forth certain information, but the discovery and invention of a means by which any information of certain sorts, regardless of what such information specifically may be, can be digested and presented for use in compact and correlated form. My purpose in developing the foregoing invention has been to provide, and I have provided, and the invention may therefore be considered as consisting of, a means or apparatus or instrumentality for the uses of business, education, and recreation, for presenting in orderly correlation with one another the physical conditions of locations of natural features of a country and of the constructions of man therein, with reference to the available sources of heat, light, and power, the sources of raw materials, the facilities for converting them into manufactured products, and the markets for the same, and the locations, directions and distances of all means for transportation; the operating conditions with respect to utilization of natural or artificial resources for manufacture, commerce and recreation, and conveyances for the carriage of persons and goods, including the factor of times and seasons in which such utilization is feasible or most effective and the time element generally in relation to natural or artificial conditions; and the financial conditions relating to the ownership and circumstances of such natural or artificial facilities and utilities as constitute property. The term "chart" as hereinbefore used is intended to be inclusive of any delineation or delineator capable of serving the purposes described and having the characteristics, or their equivalents, of the several devices and contrivances which constitute the elements of my folder.

What I claim and desire to secure by Letters Patent is:

1. A geographical and transportation compilation comprising in combination a map of a portion of the earth's surface and a chart presenting in parallel columns the several channels of communication existing on the same part of the earth's surface.

2. In a geographical and transportation compilation, the combination of a map showing a part of the earth's surface and representing the locations of channels of transportation existing in and on that part of the earth so represented, with a chart presenting in parallel columns the same channels of communication.

3. In a geographical and transportation compilation, the combination of a map showing a part of the earth's surface and representing the locations of channels of transportation existing in and on that part of the earth so represented with a chart presenting in parallel columns the same channels of communication and having adjacent to such channels the names of the localities served thereby.

4. A chart presenting in column arrangement and in groups in the columns thereof, the names of places served by established lines of communication in a specific area of the earth's surface, together with representations of such lines and the connections of one line with another.

5. A chart presenting in column arrangement and in groups in the columns thereof, the names of places served by established lines of communication in a specific area of the earth's surface, together with representations of such lines and the connections of one line with another, the arrangement of such columns and groups corresponding in a general way with the geographical relation or position of the actual lines of communication.

6. A chart of commercial intercommunication comprising columns of place names, and boundary indications between columns or groups of such names as represent places on different lines of communication, such boundary indications being interrupted between the names of places on different lines between which operating connections exist.

7. A chart of commercial intercommunication bearing the names of all places within a prescribed region which are connected by established lines, the names of all places on a single line being grouped in column in the relative order in which the places are located along the line and the groups being relatively arranged on the chart according approximately to the geographical location of the lines, and indicating means beside such groups showing conveyances available on the lines.

8. The combination of a map representing a prescribed section of country, and a route chart for the same section, the map showing locations of established lines of communication and having identifying symbols applied to the several lines, and the chart having groups of names of places in columns arranged correspondingly to the locations of the corresponding places along the respective lines and showing also beside and between such columns and groups the lines represented on the map, the columns and groups of names in certain columns being isolated from one another in an arrangement corresponding generally to the geographical locations of the several lines on which are the places corresponding to these names, each column and group having the symbol of the line to which it corresponds placed adjacent to it.

9. The combination of a map representing a prescribed section of country, and a route chart for the same section, the map showing locations of established lines of communication and having identifying symbols applied to the several lines, and the chart having groups of names of places in columns arranged correspondingly to the locations of the corresponding places along the respective lines, the columns and groups of names in certain columns being isolated from one another in an arrangement correspondingly generally to the geographical locations of the several lines on which are the places corresponding to these names, each column and group having the symbol of the line to which it corresponds placed adjacent to it, and lines beside the columns representing in number the number of conveyances available for transportation over the lines of communication.

10. The combination of a map representing a prescribed section of country, and a route chart for the same section, the map showing locations of established lines of communication and having identifying symbols applied to the several lines, and the chart having groups of names of places in columnar tabulation arranged correspondingly to the locations of the corresponding places along the respective lines, and boundary indications separating the groups which correspond to the several lines from one another, such boundary indications having openings leading from the inclosure in which a group is contained to a name in another column, to indicate that communication exists between the places corresponding to such names.

11. A route chart having groups of names in columnar arrangement each corresponding to the places on a certain line of transportation and isolated from other groups, indications at the head of each group showing the distinguishing characteristic of such line, and indications showing the points at which connections are made with other lines.

12. A route chart having groups of names in columnar arrangement, each corresponding to the places on a certain line of transportation and isolated from other groups, identification numbers or symbols applied adjacent to each group, and means indicating channels of communication leading from group to group according as there is physical connection between the lines represented by the groups, having the identification number of the connected group applied at the commencement of each channel.

13. A geographical and industrial compilation comprising in combination a sheet bearing a representation of a section of country in map form, and having established channels of communication designated thereon, and a chart having spaces inclosed by boundaries and containing the names of places on such channels of communication, and said boundaries having breaks or openings for graphically representing the only outlets for such channels of communication.

In testimony whereof I have affixed my signature.

GEORGE W. R. HARRIMAN.